No. 784,287. PATENTED MAR. 7, 1905.
G. E. WALLIN.
LINOTYPE MACHINE.
APPLICATION FILED SEPT. 28, 1904.
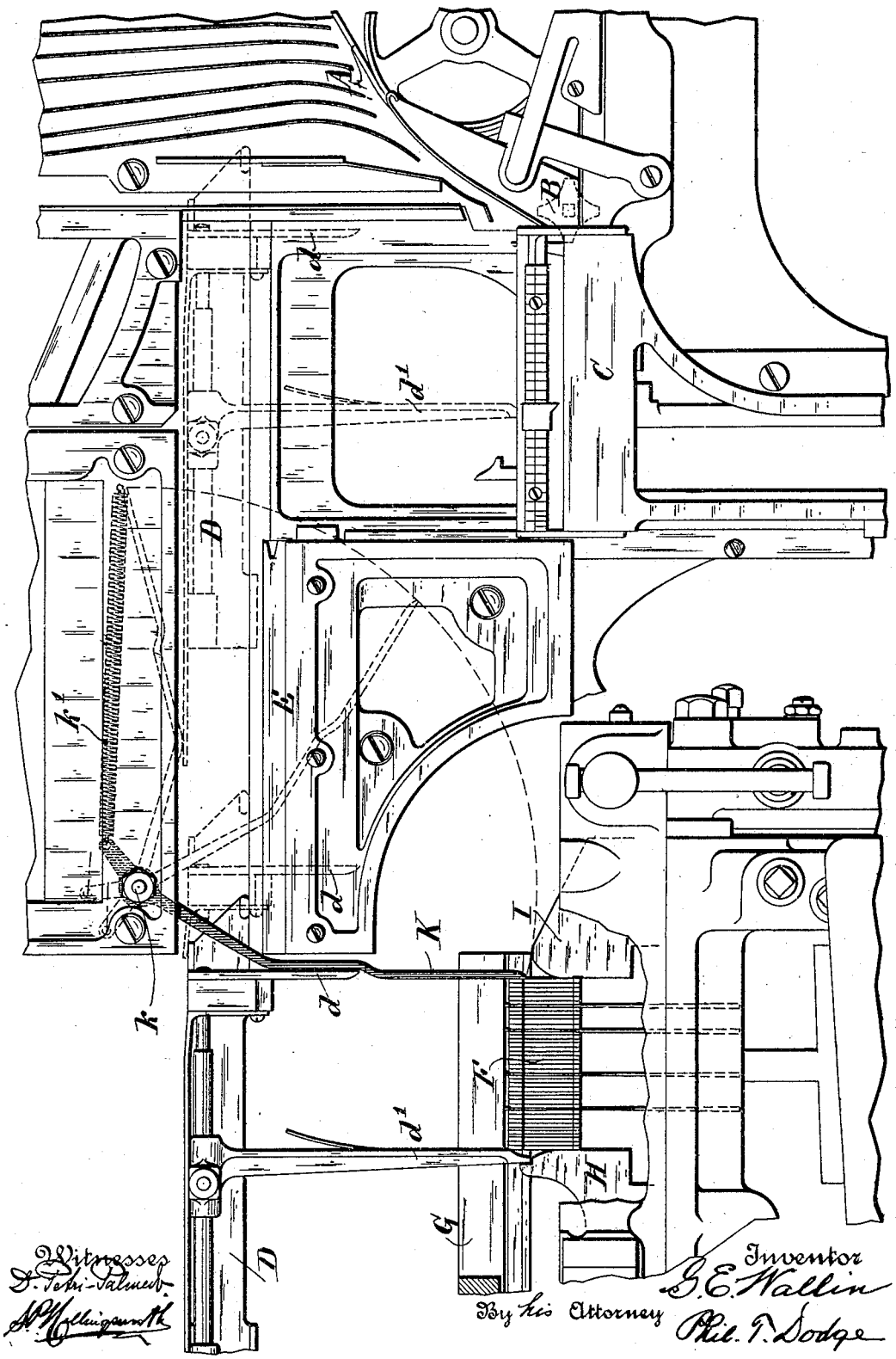

No. 784,287.                                                    Patented March 7, 1905.

UNITED STATES PATENT OFFICE.

GUSTAF E. WALLIN, OF POCATELLO, IDAHO, ASSIGNOR TO MERGENTHALER LINOTYPE COMPANY, A CORPORATION OF NEW YORK.

LINOTYPE-MACHINE.

SPECIFICATION forming part of Letters Patent No. 784,287, dated March 7, 1905.

Application filed September 28, 1904. Serial No. 226,416.

*To all whom it may concern:*

Be it known that I, GUSTAF E. WALLIN, of Pocatello, county of Bannock, and State of Idaho, have invented a new and useful Improvement in Linotype-Machines, of which the following is a specification.

My invention has reference to improvement in Mergenthaler linotype-machines of the general organization represented in Letters Patent of the United States No. 436,532, and relates particularly to means for guiding the composed lines of matrices to their operative position in front of the mold and between the confining-jaws. In this machine the composed line of matrices and spacers is raised by the assembling-elevator to a position between depending arms on a transfer-carriage. This carriage then moves to the left, carrying the composed line out of the elevator and through a stationary channel into the "first" elevator, so called, by which the line is lowered to the operative position in front of the mold and between the two jaws which confine the line endwise. The line should be composed of such length that it will descend freely between the confining-jaws; but it sometimes happens that the operator will compose the line to an excessive length and that when this line is lowered to the casting position one or more matrices at the end on the right will encounter the jaw and fail to descend properly to their places. It is to overcome this failure that the present improvement is designed.

It consists in a supplementary or extension finger acting at the right end of the line to assist in confining and guiding the same downward between the jaws. I have shown this finger pivoted to the main frame and arranged to swing down to a vertical position at the end of the line just before the latter is lowered to the mold; but it may be varied in form and movement at will, provided only it is adapted to serve as a guide for the right end of the descending matrix-line.

Referring to the accompanying drawing, the figure represents a front elevation of the assembling, transferring, and clamping mechanism of a commercial linotype-machine having my improvement added thereto.

Referring to the drawing, A represents an inclined belt, upon which the matrices selected by finger-keys are successively delivered and from which they pass downward in an upright position in front of the star-wheel B, by which they are crowded forward side by side and assembled in line in a channel in the top of the assembling-elevator C, arranged to be lifted at the will of the operator.

D represents a horizontally-sliding carriage mounted in the main frame and provided with two depending fingers $d$ and $d'$. This carriage stands normally above the assembling-elevator C, as shown in dotted lines. The parts are so arranged that when the assembler C is lifted the matrix-line F is carried upward therein between the fingers $d$ and $d'$, by which it is confined endwise. While the matrix-line is thus confined and while the assembler remains in position the carriage D moves to the left to the position shown in full lines, shifting the line out of the assembler C and through the intermediate fixed channel or guide E into the first elevator G, which at the time stands in an elevated position in line with the channel E. While the carriage and its fingers remain at rest in the position shown in full lines in the drawing the elevator G descends, lowering the line to its final position between the two confining-jaws H and I, by which its length is determined. The finger $d'$ is made, as usual, of such length that it extends downward to the upper side of the jaw H, thus forming a continuous support and guide for the matrix at the left end of the line as the latter is lowered. The finger $d$ on the right is, however, necessarily made shorter than the finger $d'$, so that it terminates at a considerable distance from the right-hand jaw I. When, therefore, the line in the course of its descent passes below the end of finger $d$, the matrix at the right end is released, so that it may shift to the right in the elevator G to such position that it will not enter freely past the inner end of the jaw I. The result in such case is that the displaced matrix fails to descend properly to its position, and the slug or linotype produced will be imperfect at one end.

The foregoing parts are of ordinary construction.

In applying my invention I provide a long finger K, having its upper end mounted on a horizontal pivot $k$ in the main frame. To this finger, above the pivot, I connect one end of a spring $k'$, attached at its opposite end to the frame and tending to swing the finger down to the operative position, shown in full lines in the drawing. The lower end of the finger K forms a downward continuation of the finger $d$ and spans the space between this finger and the jaw I, so that when the line descends the right-hand matrix receives a continuous support first from the finger $d$ and thereafter from the finger K until it is properly inside of the jaw I. After the line has been lowered the carriage D returns to its original position at the right, and in so doing the finger $d$ pushes the finger K before it, turning it upward out of the path of the carriage upon which it rests, as indicated in dotted lines, until the carriage repeats its movement to the left with the next succeeding line.

Having described my invention, what I claim is—

1. In a linotype-machine, and in combination with the line-transfer carriage and its fingers and the line-confining jaws, the supplemental finger to guide the right-hand end of the matrix-line in its descent between the jaws.

2. In a linotype-machine, the combination of means to confine the matrix-line endwise in front of the mold, means for lowering the line to said position and means for confining and guiding the line at both ends during the entire course of its descent.

3. In a linotype-machine and in combination with the jaw for confining the matrix-line at one end, the elevator for raising and lowering the line, the carriage for transferring the line to the elevator, the hinged guide-finger mounted in the path of the carriage, and the spring tending to move the finger into operative position.

4. In a linotype-machine, a line-transferring carriage having a long and a short finger and a movable supplemental finger coöperating with the short carriage-finger and forming an extension thereof.

In testimony whereof I hereunto set my hand, this 23d day of September, 1904, in the presence of two attesting witnesses.

GUSTAF E. WALLIN.

Witnesses:
C. C. CHILSON,
D. W. CHURCH.